United States Patent
Yoon et al.

(10) Patent No.: US 8,559,480 B2
(45) Date of Patent: Oct. 15, 2013

(54) APPARATUS AND METHOD FOR GENERATING SCRAMBLING CODES IN A RADIO COMMUNICATION SYSTEM

(75) Inventors: Sung Jun Yoon, Seoul (KR); Sung Jin Suh, Seoul (KR); Myung Cheul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 273 days.

(21) Appl. No.: 13/143,688

(22) PCT Filed: Jan. 15, 2010

(86) PCT No.: PCT/KR2010/000277
§ 371 (c)(1),
(2), (4) Date: Jul. 7, 2011

(87) PCT Pub. No.: WO2010/085066
PCT Pub. Date: Jul. 29, 2010

(65) Prior Publication Data
US 2011/0274193 A1    Nov. 10, 2011

(30) Foreign Application Priority Data

Jan. 20, 2009 (KR) .................. 10-2009-0004682

(51) Int. Cl.
*H04B 1/00* (2006.01)
(52) U.S. Cl.
USPC ........... 375/130; 375/260; 375/259; 375/140; 375/146; 375/135; 380/44; 380/47
(58) Field of Classification Search
USPC ................. 375/260, 130, 259, 140, 146, 135; 380/44, 47; 370/47; 385/44, 47
See application file for complete search history.

(56) References Cited

U.S. PATENT DOCUMENTS

| | | | | |
|---|---|---|---|---|
| 5,237,593 A * | 8/1993 | Fisher et al. | ................. | 375/367 |
| 5,790,626 A * | 8/1998 | Johnson et al. | ................. | 377/69 |
| 5,796,776 A * | 8/1998 | Lomp et al. | ................. | 375/222 |
| 6,282,230 B1 * | 8/2001 | Brown et al. | ................. | 375/140 |
| 6,556,555 B1 * | 4/2003 | Miller et al. | ................. | 370/335 |

(Continued)

FOREIGN PATENT DOCUMENTS

| KR | 10-2001-0015235 | 2/2001 |
|---|---|---|
| KR | 10-2001-0018182 | 3/2001 |
| KR | 10-0594042 | 6/2006 |

OTHER PUBLICATIONS

International Search Report for PCT/KR2010/000277 mailed on Aug. 17, 2010.

*Primary Examiner* — Kenneth Lam
(74) *Attorney, Agent, or Firm* — H.C. Park & Associates, PLC

(57) ABSTRACT

An apparatus and method for generating a scrambling code in a radio communication system is disclosed. In particular, an apparatus and method for generating a scrambling code using a Gold-like sequence even when m is a multiple of 4 for a length $2^m-1$ of a pseudo-random sequence is disclosed. Two LFSRs (LFSR a and LFSR a') for generating the Gold-like sequence by two different polynomials of degree m are included. The LFSR a' is constructed by a reciprocal primitive polynomial of the primitive polynomial of degree m over GF(2) used to construct the LFSR a. In order to generate $2^m$ different scrambling codes, one fixed initial value is input to the LFSR a and different initial values of m bits are input to the LFSR a' according to system-specific information.

15 Claims, 3 Drawing Sheets

(56) References Cited

U.S. PATENT DOCUMENTS

| | | |
|---|---|---|
| 6,956,948 B1 | 10/2005 | Hwang et al. |
| 7,286,589 B1 | 10/2007 | Toussi et al. |
| 7,436,963 B2 | 10/2008 | Lo Iacono et al. |
| 8,345,867 B2* | 1/2013 | Yoon et al. ............... 380/44 |
| 2002/0016806 A1* | 2/2002 | Rajski et al. ............... 708/252 |
| 2004/0054956 A1* | 3/2004 | Byrd ............... 714/785 |
| 2004/0090907 A1* | 5/2004 | An ............... 370/208 |
| 2004/0236812 A1* | 11/2004 | Stein et al. ............... 708/492 |
| 2005/0084112 A1 | 4/2005 | Kim et al. |
| 2005/0169349 A1 | 8/2005 | Hwang et al. |
| 2005/0259844 A1* | 11/2005 | Kot et al. ............... 382/100 |
| 2007/0271323 A1* | 11/2007 | Stein et al. ............... 708/492 |
| 2009/0135803 A1* | 5/2009 | Luo et al. ............... 370/350 |

* cited by examiner

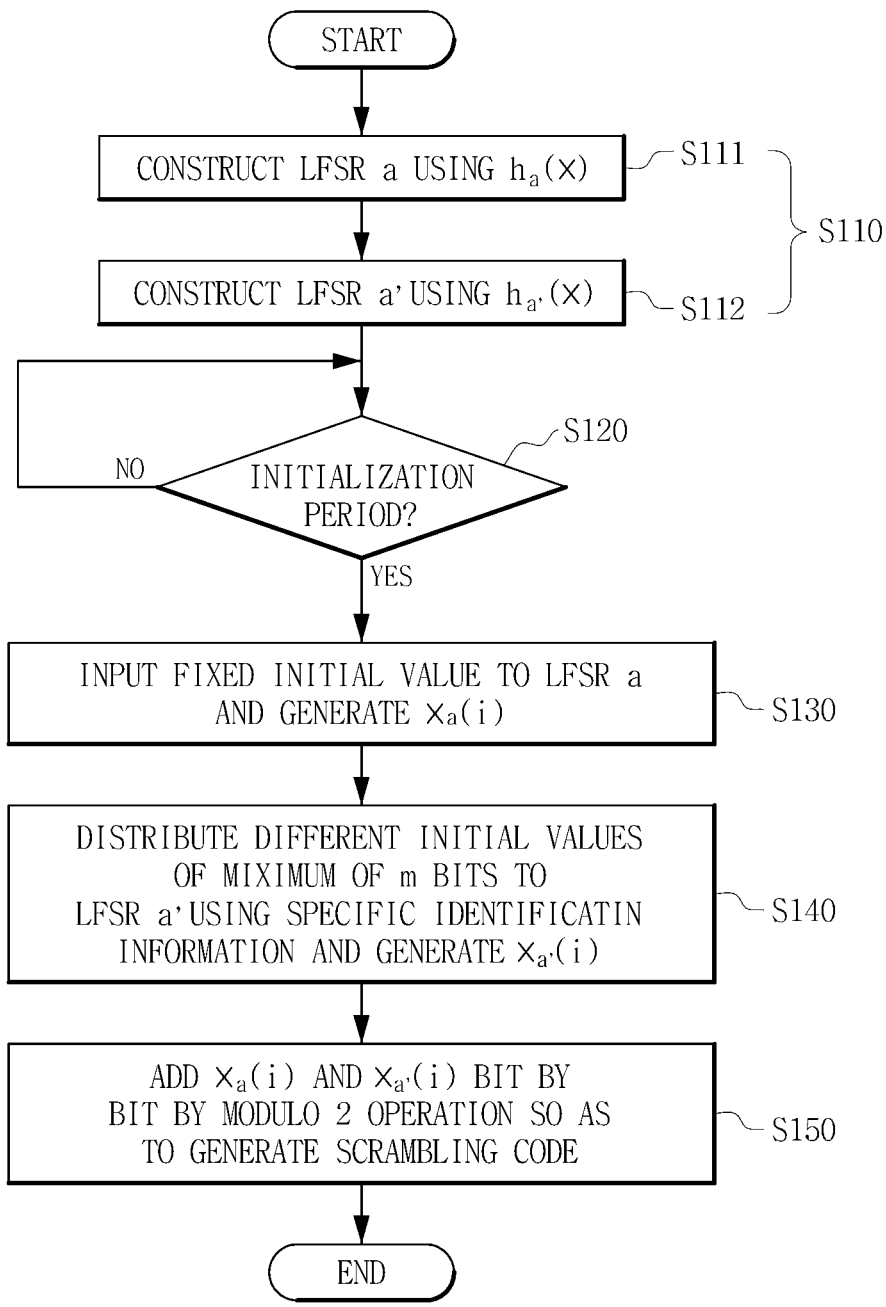

APPARATUS AND METHOD FOR GENERATING SCRAMBLING CODES IN A RADIO COMMUNICATION SYSTEM

CROSS-REFERENCE TO RELATED APPLICATIONS

This application is the National Stage Entry of International Application PCT/KR2010/000277, filed on Jan. 15, 2010, and claims priority from and the benefit of Korean Patent Application No. 10-2009-0004682, filed on Jan. 20, 2009, both of which are incorporated herein by reference for all purposes as if fully set forth herein.

BACKGROUND

1. Field

The present disclosure relates to a radio communication system and, more particularly, to an apparatus and method for generating scrambling codes in a broadband radio communication system.

2. Discussion of the Background

A pseudo-random sequence is used to identify system-specific information, such as user equipment (UE)-specific information and cell (base station)-specific information in a radio communication system, such as scrambling codes in a radio communication system.

The scrambling codes are designed according to system-specific information and are used to transmit and receive a physical signal, such as a reference signal and a physical channel of uplink and downlink.

In general, base stations are identified using scrambling codes in downlink and UEs are identified using scrambling codes in uplink.

In a next-generation radio communication system, there is a need for a method of identifying a larger number of pieces of system-specific information, such as UE-specific information or cell-specific information, by increasing the size of a scrambling code group without increasing hardware complexity.

SUMMARY

Therefore, the present disclosure is directed to providing an apparatus and method for generating a scrambling code in a radio communication system.

The present disclosure is directed to providing an apparatus and method for generating a pseudo-random sequence in a radio communication system.

The present disclosure is directed to providing an apparatus and method for generating a scrambling code for identifying system-specific information such as user equipment (UE)-specific information or cell-specific information having a size which is twice that of the existing information in a radio communication system.

The present disclosure is directed to providing an apparatus and method for generating a scrambling code capable of maintaining hardware complexity while increasing the size of a scrambling code group.

The present disclosure is directed to providing an apparatus and method for generating a scrambling code using a primitive polynomial of degree m and a reciprocal primitive polynomial of the primitive polynomial of degree m in a radio communication system.

It is to be understood that both the foregoing general description and the following detailed description are exemplary and explanatory and are intended to provide further explanation of the invention as claimed.

In one aspect, there is provided an apparatus for generating a scrambling code in a radio communication system, including: a first linear feedback shift register (LFSR) having m blocks and constructed by a primitive polynomial of degree m over GF(2); a second LFSR having m blocks and constructed by a reciprocal primitive polynomial of the primitive polynomial of degree m; a first initial value mapper configured to input a fixed initial value to the first LFSR at every initialization period; a second initial value mapper configured to selectively input one of different initial values of m bits to the second LFSR at every initialization period; a controller configured to control the second initial value mapper based on some information, a total sum of information bits of which is between 1 and m bits, in system-specific information and control one of the different initial values of m bits to be input to the second LFSR; and a modulo 2 operator configured to add an output sequence from the first LFSR and an output sequence from the second LFSR bit by bit by a modulo 2 operation.

In another aspect, there is provided a method for generating a scrambling code in a radio communication system, including: constructing a first linear feedback shift register (LFSR) having m blocks according to a primitive polynomial of degree m over GF(2); constructing a second LFSR having m blocks according to a reciprocal primitive polynomial of the primitive polynomial of degree m; inputting a fixed initial value to the first LFSR at every initialization period so as to generate a first output sequence; selecting and inputting one of different initial values of m bits to the second LFSR at every initialization period so as to generate a second output sequence; and adding the first output sequence and the second output sequence bit by bit by a modulo 2 operation.

According to the apparatus and method for generating the scrambling code of the present disclosure, it is possible to generate more scrambling codes without increasing hardware complexity.

In the embodiment, it is possible to more simply implement a system by constructing a second LFSR by a reciprocal primitive polynomial of a primitive polynomial used to construct a first LFSR.

In particular, in generation of the scrambling codes through a pseudo-random sequence, it is possible to generate $2^{32}$ scrambling codes using a Gold-like sequence, which are twice $2^{31}$ scrambling codes generated using a Gold sequence in the case of m=31.

Therefore, it is possible to prevent deterioration in a maximum cross-correlation value which influences on performance of the scrambling code, by maintaining the same hardware complexity while increasing the number of scrambling codes.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 3 is a flowchart illustrating a method for generating a scrambling code in a broadband radio communication system according to an exemplary embodiment.

DETAILED DESCRIPTION OF THE ILLUSTRATED EMBODIMENTS

Figure 1:
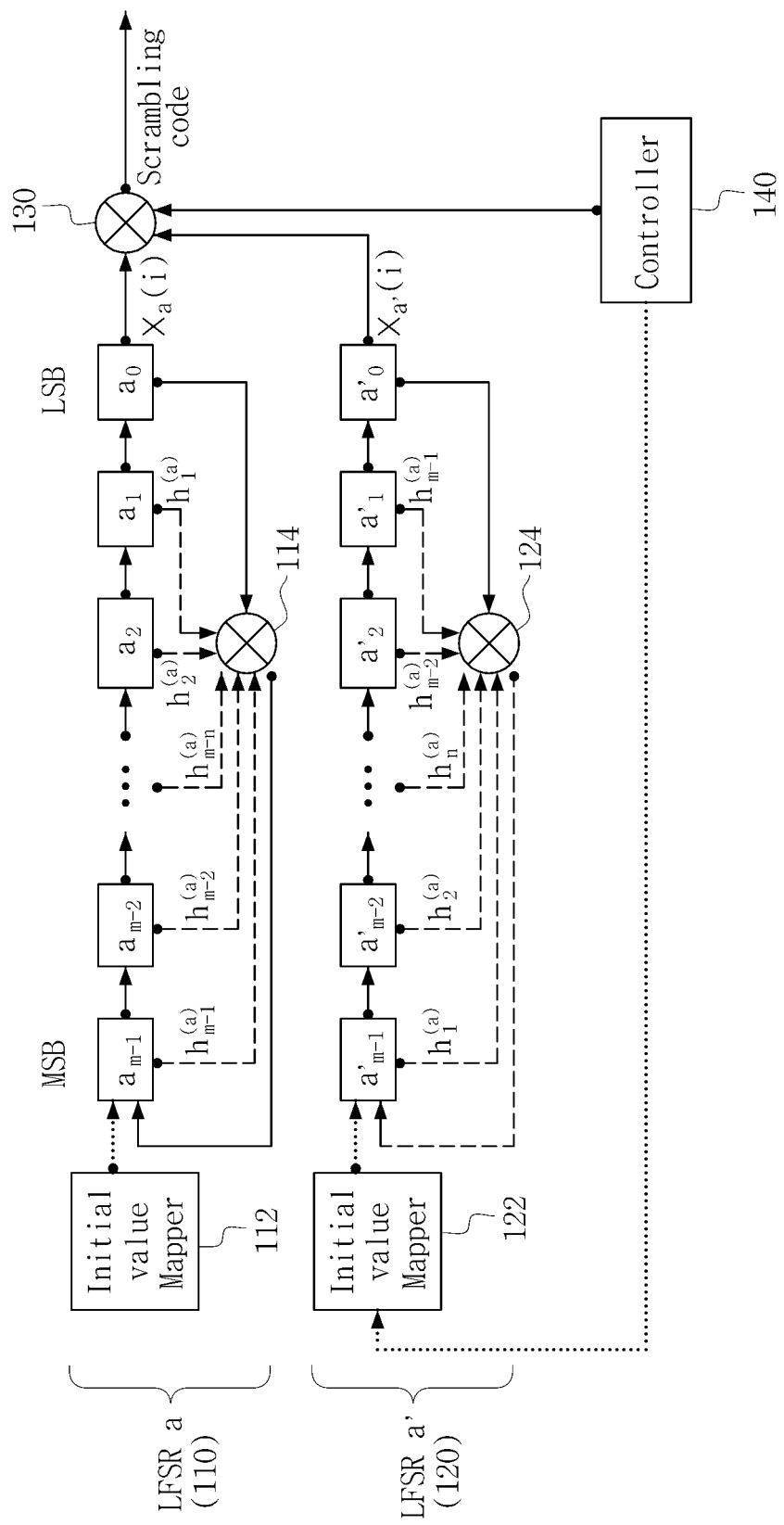
FIG. 1 is a diagram showing the configuration of an apparatus for generating a scrambling code in a broadband radio communication system according to an exemplary embodiment.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to distinguish individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

In general, the aforementioned scrambling code is generated on the basis of a pseudo-random sequence having good correlation characteristics. A well-known pseudo-random sequence may include an m-sequence, a Gordon-Mills-Welch (GMW) sequence, a Legendre sequence, or the like. The m-sequence may be converted into a primitive polynomial of degree m over GF(2), and implemented by using a linear feedback shift register (LFSR).

The pseudo-random sequence, such as the m-sequence, has optimal periodic autocorrelations. However, since the size of only a single m-sequence is 1, there is a limit to using the pseudo-random sequence as a scrambling code requiring a plurality of different random sequences having good cross-correlations (the maximum cross-correlation value is low and the number of kinds of cross-correlations is small).

Therefore, in general, by mathematically connecting pseudo-random sequences, different pseudo-random sequences of size M are generated to be used as scrambling code.

Particularly, one of the most widely used methods in a radio communication system is a method of mathematically connecting two m-sequences and generating scrambling code using a Gold sequence generated as a result.

Recently, with the development of a radio communication system, in order to identify more pieces of system-specific information, such as user equipment (UE)-specific and cell-specific information, different scrambling code groups having a larger size are needed.

In a 3GPP Wideband Code Division Multiple Access (3GPP WCDMA) system developed on the basis of the Global System for Mobile Communications (GSM), which is one of the most prominent standards among standards of the third-generation International Mobile Telecommunications-2000 (IMT-2000), scrambling code for identifying system-specific information of 25 bits by using a Gold sequence in the case of m=25 is used.

In a 3.9G (Pre-4G) Long Term Evolution (LTE) system developed from the 3GPP WCDMA, in order to identify more sufficient pieces of information than the early standardization process, a method of generating scrambling code having a very large size was proposed.

However, in the method of identifying UE-specific and cell-specific system information of 40 to 50 bits or more by using the Gold sequence in the case of m=40 or m=50 or more as the proposed scrambling code, there is a problem in that hardware complexity increases due to blocks (block or box) in a number of LFSRs connected in series.

In consideration of this, in the early standard TS36.211-8.1.0 of a physical layer part of the 3GPP LTE, in order to decrease hardware complexity, it was agreed that system-specific information, such as UE-specific and cell-specific information, was limited to 33 bits, and identified by scrambling code generated through the Gold sequence in the case of m=33. However, in the case of m=33, in consideration of hardware based on the 32-bit architecture, there still is a problem in terms of hardware complexity.

Accordingly, a Gold sequence of m=32 or less has been considered. However, in the case of m=32, since m is a multiple of 4, the Gold sequence does not exist. Therefore, it has been finally determined that system-specific information, such as UE-specific and cell-specific information, is identified by scrambling code generated from a Gold sequence in the case of m=31.

Large sets of scrambling codes are needed to identify more pieces of information. However, in a current system, in consideration of hardware complexity, the standard is determined such that a minimum number of pieces of system-specific information such as UE-specific and cell-specific information are identified. For this, a method of generating a scrambling code using a Gold sequence in the case of m=31 has been adopted.

However, a next-generation broadband radio communication system, such as the fourth-generation IMT-Advanced, requires a larger number of different scrambling codes as a frequency band is broadened and a cell radius is reduced as in a pico cell and a femto cell.

Therefore, in such a next-generation broadband radio communication system, the number of bits to identify system-specific information, such as UE-specific and cell-specific information in a related art, has to be increased.

For this, instead of considering a 32-bit structure of hardware in the related art, a Gold sequence in the case where m is greater than 32 is considered while accepting hardware complexity.

This disclosure proposes a method of identifying more pieces of system-specific information, such as UE-specific information and cell-specific information, by increasing the size of the scrambling code group while maintaining the same hardware complexity as the related art.

First, a process of generating a scrambling code using a Gold sequence will be described.

An m-sequence may be generated using a primitive polynomial of degree m over GF (2), and the primitive polynomial of degree m for generating the m-sequence may be readily implemented by using a LFSR.

An m-sequence $x_a(i)$ generated through an LFSR a is generated by a primitive polynomial of Equation 1.

$$h_a(x) = x^m + h_{m-1}^{(a)} x^{m-1} + h_{m-2}^{(a)} x^{m-2} + \ldots + h_2^{(a)} x^2 + h_1^{(a)} x^1 + 1 \quad \text{Equation 1}$$

An m-sequence $x_b(i)$, which is generated through an LFSR b and different from $x_a(i)$, is generated from a primitive polynomial of Equation 2.

$$h_b(x) = x^m + h_{m-1}^{(b)} x^{m-1} + h_{m-2}^{(b)} x^{m-2} + \ldots - h_2^{(b)} x^2 + h_1^{(b)} x^1 + 1 \quad \text{Equation 2}$$

For example, in the case of m=5, a total of six primitive polynomials exists. When two primitive polynomials $h_a(x) = x^5 + x^2 + 1$ and $h_b(x) = x^5 + x^4 + x^3 + x^2 + 1$ are selected respectively, and the LFSR a and LFSR b are implemented by using the two primitive polynomials represented by Equations 1 and 2, two different m-sequences $x_a$=(0000100101100111110001101110101) and $x_b$=(0001010110100001100100111110111) having a length of $2^5-1=31$ are generated respectively.

A Gold sequence is generated from a preferred pair of arbitrary m-sequences. Here, when it is assumed that a sequence a is an arbitrary m-sequence having a period of $N=2^m-1$, in the case where m is not the power of 2, a sequence b has a sampler $f=2^k+1$ or $f=2^{2k}-2^k-1$ for an arbitrary k which allows m/gcd(m,k) to be odd, and is sampled from the sequence a.

In this case, the two m-sequences a and b having a period of $N=2^m-1$ have a three-valued cross-correlation, and theses sequences a and b are called the preferred pair of m-sequences. For any m which is not a multiple of 4, in the case of the sampler $f=1+2^{\lfloor (m+2)/2 \rfloor}$, a preferred pair of m-sequences always exists.

For the preferred pair of m-sequences a and b, a Gold sequence G(a,b) is represented by the following equation.

$$G(a,b) = \{a, b, a \oplus b, a \oplus Tb, a \oplus T^2 b, \ldots, a \oplus T^{N-1} b\}$$

where T is a shift operator, and $\oplus$ is a modulo 2 operation. G(a,b) includes $M=2^m+1$ different sequences having a period of $M=2^m-1$. Here, M is generally called a size of a sequence set.

G(a,b) may be generated by the polynomial $h(x)=h_a(x) \cdot h_b(x)$ and $h_a(x)$ and $h_b(x)$ correspond to the primitive polynomials for generating the m-sequences a and b, respectively, as represented by Equations 1 and 2.

Therefore, the Gold sequence G(a,b) may generate the m-sequence a from the simplest (the number of terms is smallest) primitive polynomial $h_a(x)$ for an arbitrary m which is not a multiple of 4 and generate the m-sequence b having a primitive polynomial $h_b(x)$ to allow the two sequences a and b to be the preferred pair of m-sequences by sampling the sequence a with a sampler f.

The process of generating the Gold sequence G(a,b) through the two m-sequences a and b constructing the preferred pair of m-sequences may be implemented by an apparatus having two LFSRs. Specifically, the LFSR a and the LFSR b are apparatuses for respectively generating the m-sequences a and b, and the two m-sequences a and b are added bit by bit through a modulo 2 operator.

As shown in Equation 3, different Gold sequences are generated by adding a sequence obtained by shifting the sequence b by T to the fixed sequence a bit by bit using the modulo 2 operation. This may be implemented by fixing an initialization value of each block of the LFSR a constructing the sequence a and changing an initialization value of each block of the LFSR b constructing the sequence b.

That is, b=(0001010110100001100100111110111) exemplified above is a sequence generated from $h_b(x) = x^5 + x^4 + x^3 + x^2 + 1$ and may be generated by setting the initial value of each block of the LFSR to 00010. Similarly, Tb, $T^2 b$, and $T^3 b$ may be generated by setting their initial values to 00101, 01010, and 10101, respectively. In this manner, the values $T^{N-1} b$ ($N=2^5-1=31$) in b are matched with 31 initial values from 00001 to 11111 one by one.

A process for generating a scrambling code using the Gold sequence method is described as follows. A Gold sequence G(a,b) is implemented as follows.

For m=31, an m-sequence a is generated by $h_a(x) = x^{31} + x^3 + 1$, which is one of the simplest primitive polynomials among 69,273,666 primitive polynomials. In addition, an m-sequence b having a primitive polynomial $h_b(x) = x^{31} + x^3 + x^2 + x + 1$ to be a preferred pair with the sequence a is generated by sampling the sequence a with a sampler $f=2^k+1=3(k=1)$. Here, for the initial value of the m-sequence a <0, 0, 0, . . . , 0, 0, 1> is substituted without variation, and for the initial value of the m-sequence b 31-bit predetermined values from <0, 0, 0, . . . , 0, 0, 0> to <1, 1, 1, . . . , 1, 1, 1> are substituted. Specifically, the Gold sequence G(a,b) generated through the modulo 2 operator from the predetermined initial value corresponding to 31 bits of the m-sequence b generates $2^{31}$ different scrambling codes.

The $2^{31}$ different scrambling codes are used for identifying system-specific information, such as UE-specific and cell-specific information.

As described above, in the case of using the Gold sequence method, $2^m$ (about m bits) different scrambling codes may be generated from the two LFSRs (LFSRs having two m-sequences with primitive polynomials of degree m) each of which has m blocks (block or box), and a maximum cross-correlation value between scrambling codes, a period (length) of which is $2^m-1$, is $2^{\lfloor (m+2)/2 \rfloor}+1$.

Elements which influence on the performance of the scrambling code include a size, a maximum cross-correlation value, a period, etc.

Since the period (length) of the sequence may be sufficiently considered in the current system, the scrambling code may be generated by maximally increasing the size of the sequence while reducing or maintaining the maximum cross-correlation value between the sequences.

In the embodiment shown in FIG. 1, a technique of increasing the size of a scrambling sequence group which may be generated while maintaining the same period (length) of the sequence, the same maximum cross-correlation value between the sequences and the same hardware complexity, as compared to the method for generating the scrambling code using the Gold sequence.

In the embodiment, a scrambling code is generated using a Gold-like sequence transformed from the Gold sequence. The Gold-like sequence may be generated using the following three methods.

In the case of generating the Gold-like sequence from two LFSRs (LFSR a and LFSR a'), the first method for generating the scrambling code using the Gold-like sequence is equal to the Gold sequence method in terms of a sampler used to implement the second LFSR (LFSR a').

That is, the Gold sequence G(a,b) may be generated by generating the m-sequence b having a primitive polynomial $h_b(x)$ to allow the two sequences a and b to be the preferred pair of m-sequences, using the same method as Equation 3. For arbitrary m which is not a multiple of 4, the m-sequence a is generated from the simplest primitive polynomial $h_a(x)$ and the sequence a is sampled with the sampler $f=2^{\lfloor (m+2)/2 \rfloor}$.

If the above process is performed with the same sampler $f=1+2^{\lfloor (m+2)/2 \rfloor}$ when m is a multiple of 4, the generated two sequences a and b are not a preferred pair of m-sequences. Therefore, the Gold sequence may not be generated using the same method as Equation 3.

However, for any m which is a multiple of 4, in the case where the sequences generated from the LFSRs are combined using the same method as Equation 4 so as to generate the scrambling code, it is possible to generate scrambling codes having the same sequence length, sequence size and maximum cross-correlation value as compared to the Gold sequence method.

$$H(a,b)=\{a, a \oplus b^{(0)}, a \oplus Tb^{(0)}, \ldots, a \oplus T^{((2^m-1)/3)-1} b^{(0)};$$

$$a \oplus b^{(1)}, a \oplus Tb^{(1)}, \ldots, a \oplus T^{((2^m-1)/3)-1} b^{(1)};$$

$$a \oplus b^{(2)}, a \oplus Tb^{(2)}, \ldots, a \oplus T^{((2^m-1)/3)-1} b^{(2)}\} \quad \text{Equation 4}$$

where, $b^{(k)}$ is a sequence sampled from $T^k a$ with the same sampler f, T is a shift operator, and $\oplus$ is a modulo 2 operation.

Equation 4 is different from Equation 3 in the method for combining sequences, that is, a subject and a method for performing a shift operation. The result value of the method of combining the sequences represented by Equation 4 one-to-one correspond to the case where the initial value of each block of the LFSR b constructing the sequence b is changed to $2^m$ values from <0, 0, 0, . . . , 0, 0, 0> to <1, 1, 1, . . . , 1, 1, 1>.

Therefore, for any m which is a multiple of 4, the sequences are combined using Equation 4, and similarly to the Gold sequence method of Equation 3, if an initial value of each block of the LFSR a constructing the sequence a is fixed and an initial value of each block of the LFSR b constructing the sequence b is changed, it is possible to generate scrambling codes for any m including m which is a multiple of 4.

In second and third methods for generating scrambling codes using the Gold-like sequence, unlike the sampler value of the first method for generating the scrambling codes using the Gold sequence or the Gold-like sequence, a polynomial for implementing the second LFSR (LFSR a') is obtained by setting a sampler to $f=1+2^{\lfloor (m+2)/2 \rfloor}$ for any m which is a multiple of 4 and setting a sampler to $f=-2+2^m$ for any m which is a multiple of 2.

The sequences generated from the LFSRs (LFSR a and LFSR a') are combined as shown in Equation 5 so as to generate scrambling codes.

$$I(a,b)=\{a, b, a \oplus b, a \oplus Tb, a \oplus T^2 b, \ldots, a \oplus T^{2^m-2} b\}$$

where, T is a shift operator, and $\oplus$ is a modulo 2 operation. At this time, both H(a,b) and I(a,b) have a period $N=2^m-1$ and respectively include $M=2^m$ and $M=2^m+1$ different sequences.

The maximum cross-correlation values respectively have $1+2^{(m-2)/2}$ and $-1+2^{(m+2)/2}$, which are similar to the values of the Gold sequence method. However, in the case where m is a multiple of 4, the Gold sequence does not exist. Therefore, if a Gold-like sequence, the number of bits of which is greater than the Gold sequence by 1 bit, is used, it is possible to generate different scrambling codes, which are twice a number of the scrambling codes generated in the case of using the Gold sequence.

For example, in the case of m=32, the Gold sequence does not exist. Therefore, if the Gold-like sequence of m=32 is used, it is possible to generate different scrambling codes, which are twice a number of the scrambling codes generated in the case of using the Gold sequence of m=31.

In particular, the last method of the three methods for generating the scrambling codes using the Gold-like sequence, that is, the method for obtaining the polynomial for implementing the second LFSR (LFSR a') using the sampler $f=-2+2^m$, can be easily implemented by the reciprocal primitive polynomial of the primitive polynomial for implementing the first LFSR (LFSR a).

For example, in the case of m=6, when the primitive polynomial for implementing the first LFSR (LFSR a) is $h_a(x)=x^6+x+1$, the second LFSR (LFSR a') may be easily implemented by the reciprocal primitive polynomial $h_a'(x)=x^6+x^5+1$ thereof.

Hereinafter, the apparatus for generating the scrambling codes in the broadband radio communication system according to an exemplary embodiment will be described in detail with reference to FIGS. 1 and 2.

FIG. 1 is a diagram illustrating the configuration of an apparatus for generating scrambling codes in a broadband radio communication system according to an exemplary embodiment, which shows an apparatus for generating scrambling codes using the above-described Gold-like sequence.

Referring to FIG. 1, the apparatus for generating the scrambling codes according to an exemplary embodiment includes a LFSR a 110 connected to a first initial value mapper 112, a LFSR a' 120 connected to a second initial value mapper 122, a modulo 2 operator 130, and a controller 140.

The LFSR a 110 having m blocks $a_{m-1}, a_{m-2}, \ldots, a_2, a_1$ and $a_0$ is implemented by a primitive polynomial of degree m over GF(2) which is one of two different polynomials of degree m for generating the Gold-like sequence. The first initial value mapper 112 inputs one fixed initial value to the LFSR a 110 at every initialization period.

The LFSR a' 120 having m blocks $a'_{m-1}, a'_{m-2}, \ldots, a'_2$, and $a'_0$ is implemented by a polynomial of degree m which is the other of two different polynomials of degree m for generating the Gold-like sequence. The second initial value mapper 122 inputs one of m-bit different initial values to the LFSR a' 120 at every initialization period.

The LFSR a 110 and the LFSR a' 120 include m blocks $a_{m-1}, a_{m-2}, \ldots, a_2, a_1$ and $a_0$ and $a'_{m-1}, a'_{m-2}, \ldots, a'_2$, and $a'_0$ for performing shift operations at every clock and the modulo 2 operators 114 and 124, respectively.

The modulo 2 operators 114 and 124 add all state values of the respective blocks connected thereto by modulo 2 operations and feed the added values back to the respective first blocks $a_{m-1}$ and $a'_{m-1}$, at every clock.

In the LFSRs 110 and 120, a determination as to which of the m blocks is connected to the modulo 2 operator is made by two different polynomials of degree of m for generating the Gold-like sequence.

The controller 140 controls the second initial value mapper 122 on the basis of some information, a total sum of information bits of which is between 1 and m bits, in the system-specific information and distributes different m-bit initial values input to the LFSR a' 120.

The LFSR a 110 and the LFSR a' 120 may be implemented by $h_a(x)$ and $h_{a'}(x)$, respectively. The coefficients $h_{m-n}(x)$ located in front of x terms of the respective polynomials are 1 or 0. The blocks are connected to the modulo 2 operator 114 and 124 in the LFSRs 110 and 120 if the coefficients are 1 and are not connected to the modulo 2 operator 114 and 124 in the LFSRs 110 and 120 if the coefficients are 0.

The modulo 2 operators 114 and 124 of the LFSRs 110 and 120 add the state values of the blocks of the LFSRs respectively connected thereto at every clock and feed the added values back to the respective first blocks of the LFSRs 110 and 120.

Here, $h_a(x)$ corresponds to a primitive polynomial for generating the m-sequence as described above. The sequence b having the polynomial $h_a(x)$ is sampled from the sequence a with a sampler f. At this time, the sampler f is one of the three samplers of Equation 6.

Equation 6

$$H(a,b){:}f = 1 + 2^{\lfloor (m-2)/2 \rfloor} \text{ for } m{-}0 (\bmod 4) \quad 1)$$

$$I(a,b){:}f = -1 + 2^{\lfloor (m-2)/2 \rfloor} \text{ for } m{-}0 (\bmod 4) \quad 2)$$

$$I(a,b){:}f = -2 + 2^m \text{ for } m{-}0 (\bmod 2) \quad 3)$$

For convenience of description, a polynomial, the number of terms of which is smallest, may be selected as $h_a(x)$ from among a plurality of primitive polynomials for generating the m-sequence a.

For example, in the case of m=32, a total of 67,108,864 primitive polynomials exists and, from among them, $h_a(x)=x^{32}+x^7+x^6+x^2+1$, $h_a(x)=x^{32}+x^8+x^5+x^2+1$, $h_a(x)=x^{30}+x^9+x^3+x^2+1$ including five terms may be selected as $h_a(x)$ for the LFSR a 110. If the third sampler of Equation 6 is used, as expressed by Equation 7, $h_{a'}(x)$ may be readily generated by the reciprocal primitive polynomial of $h_a(x)$.

The LFSR a 110 and the LFSR a' 120 are components for generating the sequences a and b and respectively have m blocks. The sequences a and b output from the LFSR a 110 and the LFSR a' 120 are added bit by bit through the modulo 2 operator 130 so as to generate the scrambling codes.

The polynomials $h_a(x)$ and $h_{a'}(x)$ of Equation 7 may be represented by the LFSR a 110 and the LFSR a' 120, respectively.

$$h_a(x) = x^m + h_{m-1}^{(a)} x^{m-1} + h_{m-2}^{(a)} x^{m-2} + \ldots + h_2^{(a)} x^2 + h_1^{(a)} x^1 + 1$$

$$h_{a'}(x) = x^m + h_1^{(a)} x^{m-1} + h_2^{(a)} x^{m-2} + \ldots + h_{m-2}^{(a)} x^2 + h_{m-1}^{(a)} x^1 + 1 \quad \text{Equation 7}$$

The LFSR a 110 and the LFSR a' 120 may be implemented by the polynomials $h_a(x)$ and $h_{a'}(x)$ obtained using such a method.

However, different scrambling codes may be generated by adding the sequence obtained by shifting the sequence b by T to the fixed sequence a bit by bit through the modulo 2 operation. The initial value of each block of the LFSR a 110 constructing the sequence a is fixed and the initial value of each block of the LFSR a' 120 constructing the sequence b is changed.

The initial value of the first initial value mapper 112 for mapping the initial value to each block of the LFSR a 110 is fixed to the same value. The initial value of the second initial value mapper 122 for mapping the initial value to each block of the LFSR a' 120 is set to m-bit ($2^m$) different values.

Figure 2:
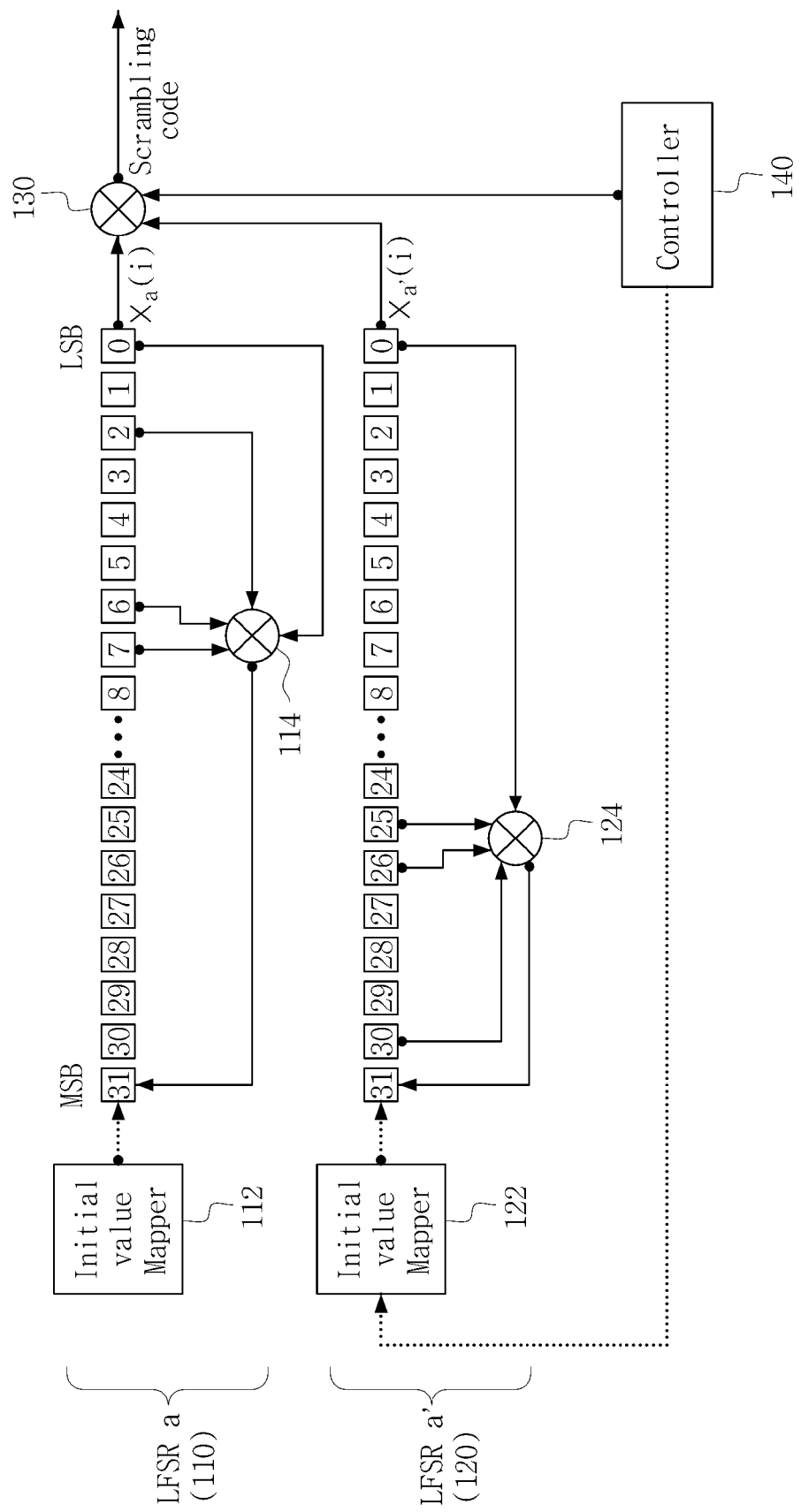
FIG. 2 is a diagram showing the configuration of the apparatus for generating the scrambling code shown in FIG. 1 in the case of m=32.

FIG. 2 is a diagram showing the configuration of the apparatus for generating the scrambling in the case of m=32 in the exemplary embodiment. FIG. 2 shows the configuration of the two LFSRs of the apparatus for generating the scrambling code in the case of m=32.

First, one polynomial, the number of terms of which is smallest, is selected from among a total of 67,108,864 primitive polynomials. For example, $h_a(x)=x^{32}+x^7+x^6+x^2+1$ is selected.

In the exemplary embodiment of FIG. 2, a primitive polynomial is set to $h_a(x)$ and the LFSR a 110 for generating the sequence a according to $h_a(x)$ is implemented. In addition, the LFSR a' 120 is implemented using the sequence b with the polynomial $h_{a'}(x)$ sampled from the sequence a with one of the three samplers f shown in Equation 6.

The modulo 2 operators 114 and 124 of the LFSRs 110 and 120 add the state values of the blocks of the LFSRs respectively connected thereto through the modulo 2 operations at every clock and feed the added values back to the respective first blocks (most significant bit (MSB)) of the LFSRs 110 and 120.

The values $x_a(i)$ and $x_{a'}(i)$ output from the respective last blocks (least significant bit (LSB)) of the LFSRs 110 and 120 are added bit by bit through the modulo 2 operators 114 and 124 at every clock. One scrambling code is obtained by arranging the values output as the result.

In particular, if the third sampler of the three samplers f of Equation 6 is used, the polynomial $h_{a'}(x)$ may be easily obtained by the reciprocal primitive polynomial of the primitive polynomial $h_a(x)$. If $h_a(x)=x^{32}+x^7+x^6+x^2+1$ is the primitive polynomial $h_a(x)$ necessary to implement the LFSR a 110, the polynomial $h_{a'}(x)$ necessary to implement the LFSR a' 120 is $h_{a'}(x)=x^{32}+x^{30}+x^{26}+x^{25}+1$ which is the reciprocal primitive polynomial of $h_a(x)$.

The initial value mappers 112 and 122 for initializing the state values of the blocks of the LFSRs 110 and 120 at every initialization period have the following values as the initialization values mapped to the LFSRs 110 and 120.

First, the first initial value mapper 112 for the LFSR a 110 maps a specific fixed value at every initialization period. The example of this value is <0, 0, 0, . . . , 0, 0, 1> or <1, 0, 0, . . . , 0, 0, 0>. The second initial value mapper 122 for the LFSR a' 120 maps various initialization values corresponding to a total 32 bits from <0, 0, 0, . . . , 0, 0, 0> to <1, 1, 1, . . . , 1, 1, 1> at every initialization period. At this time, a determination as to which of a total of $2^{32}$ initialization values corresponding to the 32 bits is mapped is made by the controller 140.

That is, the controller 140 receives system-specific information, such as UE-specific information or cell-specific information, corresponding to the 32 bits and inputs the information value to the second initial value mapper 122.

The initialization periods when the initial values are input to the LFSRs 110 and 120 differ between physical signals or physical channels of the uplink or downlink. The initial period may include a subframe period, a radio frame period, an orthogonal frequency-division multiplexing (OFDM) symbol period, a code block period, etc.

Examples of the system-specific information, such as UE-specific information and cell-specific information include a UE ID, a cell ID, a subframe number, a stream ID, a multimedia broadcast multicast service (MBMS) over single frequency network (MBSFN) area ID, an OFDM symbol number, etc.

In particular, in the 3GPP LTE, the number of bits of a UE ID identified by 16 bits and a cell ID identified by 9 bits may be increased as the system has been developed.

For example, as shown in FIG. 2, it is assumed that the Gold-like sequence method is applied to hardware based on the 32-bit architecture. In this case, as compared to the case where the Gold sequence method is applied to the same hardware architecture, the number of bits of the cell ID may be doubled (10 bits, a maximum 1024) while maintaining the 32-bit architecture without increasing hardware complexity.

As a result, according to the exemplary embodiment, even when m is a multiple of 4, using the Gold-like sequence, it is possible to generate the scrambling codes using the method similar to the Gold sequence method.

In particular, in the case of m=32, an efficient calculation operation considering hardware based on the 32-bit architecture may be performed. In the case where the third method is used among the methods for implementing the two LFSRs using the Gold-like sequence method, it is possible to more simply implement the second LFSR (LFSR a') using the reciprocal primitive polynomial of the primitive polynomial used to implement the first LFSR (LFSR a). In the case where a primitive polynomial, the number of terms of which is smallest, is necessary to implement the first LFSR (LFSR a), the number of terms of the reciprocal primitive polynomial necessary to implement the second LFSR (LFSR a') is also decreased. Therefore, in this case, it is possible to implement an apparatus for generating a scrambling code using a simpler LFSR architecture.

As compared to the case of generating $2^{31}$ scrambling codes using the Gold sequence in the case of m=31, in the embodiment, $2^{32}$ scrambling codes, which are twice a number of scrambling codes generated in the case of using the Gold sequence, may be generated without deteriorating the maximum cross-correlation value which influences the performance of the scrambling code. By this configuration, the number of pieces of identified system-specific information, such as UE-specific and cell-specific information, such as a cell ID, may be doubled.

Accordingly, in a next-generation broadband radio communication system, such as a fourth-generation IMT-Advanced (3GPP LTE-A), which requires a larger number of different scrambling codes as a frequency band is broadened and a cell radius is reduced as in a pico cell and a femto cell, it is possible to identify a larger number of pieces of system-specific information, such as UE-specific and cell-specific information, without increasing hardware complexity.

Hereinafter, a method for generating a scrambling code in a broadband radio communication system according to an exemplary embodiment will be described in detail with reference to FIG. 3.

FIG. 3 is a flowchart illustrating a method for generating a scrambling code in a broadband radio communication system according to an exemplary embodiment, which shows the method for generating the scrambling code using the apparatus shown in FIG. 1.

First, a LFSR a 110 and a LFSR a' 120 are constructed or generated by two different polynomials of degree m (S110). The LFSR a 110 and the LFSR a' 120 respectively have m blocks and modulo 2 operators 114 and 124 as shown in FIG. 1. A determination as to which of the blocks in the LFSRs 110 and 120 is connected to the modulo 2 operators 114 and 124 is made by the two different polynomials of degree m for generating the Gold-like sequence.

More specifically, in order to obtain two different polynomials of degree m for generating the Gold-like sequence, first, a first primitive polynomial of degree m over GF(2) is selected and the LFSR a 110 is constructed by the selected first primitive polynomial of degree m (S111). In addition, a second primitive polynomial is generated by sampling a binary sequence generated by the first primitive polynomial of degree m with the sampler $f=1+2^{\lfloor (m+2)/2 \rfloor}$, $f=-1+2^{\lfloor (m+2)/2 \rfloor}$, or $f=-2+2^m$, and the LFSR a' 120 is constructed by the second polynomial (S112).

In particular, in the case of sampling the sequence a output from the LFSR a 110 using the sampler $f=-2+2^m$, the second primitive polynomial of degree m for implementing the LFSR a' 120 becomes the reciprocal primitive polynomial of the first primitive polynomial of degree m. If a polynomial, the number of terms of which is smallest, is selected from among a plurality of primitive polynomials of degree m over GF(2) as the first primitive polynomial of degree m, a second primitive polynomial of degree m, the number of terms of which is smallest, is selected.

Therefore, the hardware architecture may be further simplified. In this case, the binary sequences generated by the first and second primitive polynomials of degree m become m-sequences.

Thereafter, if an initialization period arrives (S120), the controller 140 inputs one initial value to the LFSR a 110 having the m blocks through the first initial value mapper 112 so as to generate a first output sequence $x_a(i)$ (S130).

The controller 140 inputs different initial values of a maximum of m bits to the LFSR a' 120 through the second initial value mapper 122 so as to generate a second output sequence $x_{a'}(i)$ (S140).

One fixed initial value input to the LFSR a 110 may be a value <0, 0, 0, . . . , 0, 0, 1> is or <1, 0, 0, . . . , 0, 0, 0> of a length of m. The different initial values input to the LFSR a' 120 may be one of r different initial values having a length of m from <0, 0, 0, . . . , 0, 0, 0> to <1, 1, 1, . . . , 1, 1, 1>. Different initial values of a maximum of m bits input to the LFSR a' 120 may be distributed based on some information, a total sum of information bits of which is between 1 and m bits, in the system-specific information.

More specifically, different initial values of m bits input to the LFSR a' 120 may be one of elements of a subset of the set A in which the number of elements is M of $0<M \leq 2^m$. M is set based on the set A having a total of $2^m$ different initial values <0, 0, 0, . . . , 0, 0, 0> to <1, 1, 1, . . . , 1, 1, 1> having a length of m as elements and the number of cases of the system-specific information distributed to the LFSR a' 120.

The first output sequence $x_a(i)$ output from the LFSR a 110 and the second output sequence $x_{a'}(i)$ output from the LFSR a' 120 are added bit by bit through the modulo 2 operator 130 so as to generate a final scrambling code (S150).

The apparatus and method for generating the scrambling code according to the exemplary embodiments may be used in a radio communication system for generating a scrambling code having a larger size without increasing hardware complexity.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Thus, it is intended that the present invention cover the modifications and variations of is this invention provided they come within the scope of the appended claims and their equivalents.

The invention claimed is:

1. An apparatus to generate a scrambling code in a radio communication system, the apparatus comprising:
   a first linear feedback shift register (LFSR) comprising m blocks and constructed by a primitive polynomial of degree m over Galois Field of two (GF(2));
   a second LFSR comprising m blocks and constructed by a reciprocal primitive polynomial of the primitive polynomial of degree m;
   a first initial value mapper configured to input a fixed initial value to the first LFSR at every initialization period;
   a second initial value mapper configured to selectively input one of different initial values of m bits to the second LFSR at every initialization period;
   a controller configured to control the second initial value mapper based on a total sum of information bits, the total sum being between 1 and m bits, of system-specific information and to control one of the different initial values of m bits to be input to the second LFSR; and
   a modulo 2 operator configured to add an output sequence from the first LFSR and an output sequence from the second LFSR bit by bit by a modulo 2 operation,
   wherein m is an integer number greater than 0.

2. The apparatus according to claim 1, wherein the initialization period is at least one of a subframe period, a radio frame period, an orthogonal frequency division multiplexing (OFDM) symbol period and a code block period in each physical signal or physical channel of uplink or downlink.

3. The apparatus according to claim 1, wherein the system-specific information includes information regarding at least one of a user equipment (UE) ID, a cell ID, a subframe number, a stream ID, a multimedia broadcast multicast service (MBMS) over single frequency network (MBSFN) area ID, an OFDM symbol number in each physical signal or physical channel of uplink or downlink.

4. The apparatus according to claim 1, wherein the fixed initial value input to the first LFSR is at least one of a value <0, 0, 0, ..., 0, 0, 1> or <1, 0, 0, ..., 0, 0, 0> having a length of m.

5. The apparatus according to claim 1, wherein one of the different initial values of m bits input to the second LFSR is one of elements of a subset of a set A in which the number of elements is M, for M of $0 < M \leq 2^m$ which is set based on the set A having a total of $2^m$ different initial values <0, 0, 0, ..., 0, 0, 0> to <1, 1, 1, ..., 1, 1, 1> having a length of m as elements and the number of cases of system-specific information distributed to the second LFSR by the controller.

6. The apparatus according to claim 1, wherein m is 32.

7. The apparatus according to claim 1, wherein the first LFSR and the second LFSR are constructed by two different polynomials of degree m for generating a Gold-like sequence.

8. A method for generating a scrambling code in a radio communication system, the method comprising:
   constructing a first linear feedback shift register (LFSR) comprising m blocks according to a primitive polynomial of degree m over Galois Field of two (GF(2));
   constructing a second LFSR comprising m blocks according to a reciprocal primitive polynomial of the primitive polynomial of degree m;
   inputting a fixed initial value to the first LFSR at every initialization period so as to generate a first output sequence;
   selecting and inputting one of different initial values of m bits to the second LFSR at every initialization period so as to generate a second output sequence; and
   adding the first output sequence and the second output sequence bit by bit by a modulo 2 operation,
   wherein m is an integer number greater than 0.

9. The method according to claim 8, wherein the initialization period is at least one of a subframe period, a radio frame period, an orthogonal frequency division multiplexing (OFDM) symbol period and a code block period in each physical signal or physical channel of uplink or downlink.

10. The method according to claim 8, wherein the generating the second output sequence includes controlling and generating the different initial values of the m bits input to the second LFSR based on a total sum of information bits, the total sum being between 1 and m bits, of system-specific information.

11. The method according to claim 10, wherein the system-specific information includes information regarding at least one of a user equipment (UE) ID, a cell ID, a subframe number, a stream ID, a multimedia broadcast multicast service (MBMS) over single frequency network (MBSFN) area ID, an OFDM symbol number in each physical signal or physical channel of uplink or downlink.

12. The method according to claim 8, wherein the fixed initial value input to the first LFSR is at least one of a value <0, 0, 0, ..., 0, 0, 1> or <1, 0, 0, ..., 0, 0, 0> having a length of m.

13. The method according to claim 8, wherein one of the different initial values of m bits input to the second LFSR is one of elements of a subset of a set A in which the number of elements is M, for M of $0 < M \leq 2^m$ which is set based on the set A having a total of $2^m$ different initial values <0, 0, 0, ..., 0, 0, 0> to <1, 1, 1, ..., 1, 1, 1> having a length of m as elements and the number of cases of system-specific information distributed to the second LFSR by the controller.

14. The method according to claim 8, wherein m is 32.

15. The method according to claim 8, wherein the constructing the first LFSR and the second LFSR includes generating two different polynomials of degree m using a Gold-like sequence.

* * * * *